W. S. BRITTIN.
TEMPERATURE INDICATOR.
APPLICATION FILED DEC. 4, 1917.
1,276,024.
Patented Aug. 20, 1918.
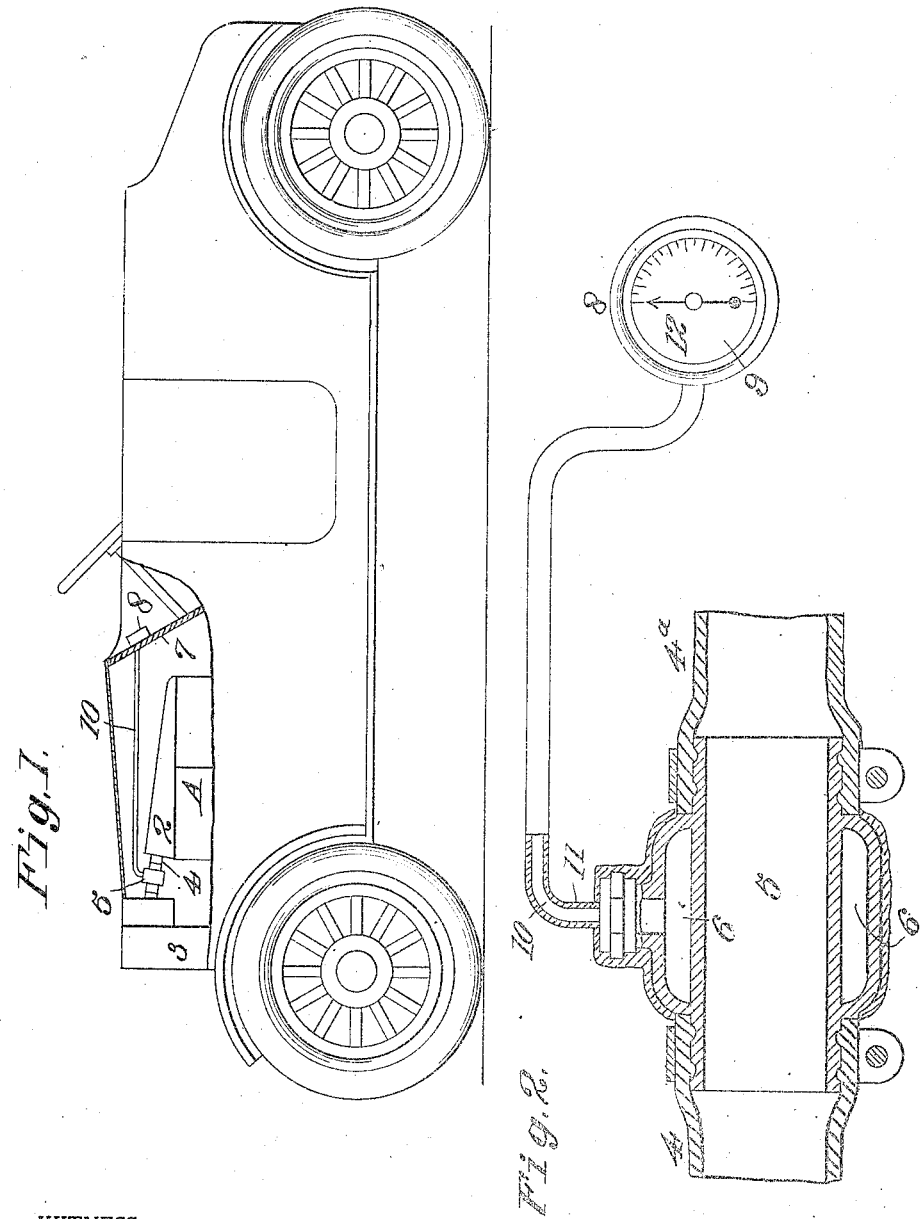
WITNESS
Charles Rickles
J.C. Benesch.
INVENTOR.
Walter S. Brittin.
BY
Strong & Townsend
ATTORNEYS

UNITED STATES PATENT OFFICE.

WALTER S. BRITTIN, OF VALLEJO, CALIFORNIA.

TEMPERATURE-INDICATOR.

1,276,024.

Specification of Letters Patent.  Patented Aug. 20, 1918.

Application filed December 4, 1917. Serial No. 205,291.

*To all whom it may concern:*

Be it known that I, WALTER S. BRITTIN, a citizen of the United States, residing at Vallejo, in the county of Solano and State of California, have invented new and useful Improvements in Temperature-Indicators, of which the following is a specification.

This invention relates to a temperature indicator.

One of the objects of the present invention is to provide a temperature indicator particularly adapted for use in connection with automobiles to visibly indicate the temperature of the circulating water through the cylinders and radiator. Another object of the invention is to provide a device of the character described which is provided with a temperature indicator adapted to be positioned directly on the dashboard of an automobile, and in conjunction therewith means for actuating the same which may be connected with the hose interposed between the engine and the radiator or in any other convenient water passage of the circulating system. Further objects will hereinafter appear.

The invention consists of the parts and the construction and combination of parts as hereinafter more fully described and claimed, having reference to the accompanying drawings, in which—

Figure 1 is a side elevation of an automobile, partly broken away, showing the application of the invention.

Fig. 2 is a detail view, partly in section, showing the temperature indicator and its connected actuating mechanism.

Referring to the drawings in detail, A indicates the cylinders of a standard form of automobile engine, 2 the return manifold through which the jacket water discharges, 3 a radiator of suitable construction, and 4 the flexible hose connection between the manifold 2 and the radiator. The hose provided in the present instance consists of two sections 4 and 4ᵃ, and adapted to be interposed between said sections is a nipple 5 which is provided with a surrounding annular chamber 6 which is adapted to receive a liquid or fluid whose thermal properties are most suitable for the use here shown.

Adapted to be placed directly on the dashboard 7 of the vehicle is a temperature indicator 8. This temperature indicator consists of a standard form of pressure gage, the ordinary pressure dial being removed and a temperature indicating dial 9 being substituted therefor. Connecting the pressure gage with the annular chamber 6 is a copper tube 10, and surrounding said tube and also the annular chamber 6 is an insulating material 11 which may consist of asbestos or the like.

In actual operation, with the parts connected as shown in Fig. 1, it is only necessary to fill the chamber 6, tube 10 and connected pressure gage with a suitable fluid or liquid, for instance alcohol, care being taken that the parts are completely filled and then sealed. Operation of the engine under such conditions naturally heats the circulating water and the temperature thus created is transmitted to the liquid in the chamber 6 which, of course, expands in proportion to the increase in temperature. The pressure thus produced by the expansion of the liquid extends the pressure gage and thereby moves the hand 12 which moves over the dial and thereby visibly indicates the temperature.

It is well known that there is a definite relation between the pressure and temperature produced and that these follow definite laws, depending upon the thermal properties of the fluid or liquid employed. Thus if the position of the hand on the dial of the gage 9 is marked according to the temperature of the liquid or fluid employed at the time of filling or charging, say 60° Fahrenheit, then any subsequent change in temperature within the chamber 6 will cause a definite change of pressure and will thereby expand the tube of the gage and swing the hand a definite distance on the temperature scale provided. It can, therefore, be seen how variations in pressure will instantly register readings upon the gage 9.

The present invention is particularly adapted for the use here shown, first, because it permits the temperature gage to be placed on the dashboard where it may be conveniently observed at all times by the operator and, secondly, because it may be attached to any standard car in use, as practically all cars are equipped with a hose connection, as shown at 4.

While the nipple or sleeve 5 is shown as interposed between the hose sections 4 and 4ᵃ, I wish it understood that it may be connected with the manifold 2 or at any other convenient point where the circulating water passes and also that the materials and finish of the several parts employed may be such as the experience and judgment of the manufacturer may dictate.

Having thus described my invention, what I claim and desire to secure by Letters Patent is—

1. The combination with the jacket surrounding the cylinders and the radiator on an automobile, of a hose connecting the jacket with the radiator to permit water to circulate therethrough, a nipple member in the hose through which the water passes, said nipple having a chamber formed therearound adapted to contain an expansible liquid, a temperature dial on the dashboard of the automobile, a movable hand on the dial, and means actuated by expansion of the liquid for moving the hand, said means being connected to said chamber by a tube.

2. The combination with the jacket surrounding the cylinders and the radiator on an automobile, of a hose connecting the jacket with the radiator to permit water to circulate therethrough, a nipple member in the hose through which the water passes, said nipple having a chamber formed therein, a temperature indicating gage on the dashboard of the automobile, a tube connecting the gage with the chamber on the nipple, and an expansible liquid forming a filler for the gage, the tube and the chamber to operate the gage according to the changes of the temperature of said liquid.

In testimony whereof I have hereunto set my hand in the presence of two subscribing witnesses.

WALTER S. BRITTIN.

Witnesses:
H. M. LOVELACE,
WILLIAM GUIHL.